March 24, 1953 W. F. BLOCK 2,632,448

VISIBLE INDEX RECORD CARD

Filed Oct. 13, 1950

Inventor

Wilhelm F. Block

By [signature]

Attorney

Patented Mar. 24, 1953 2,632,448

UNITED STATES PATENT OFFICE 2,632,448

VISIBLE INDEX RECORD CARD

Wilhelm F. Block, White Plains, N. Y., assignor to Remington Rand Inc., New York, N. Y., a corporation of Delaware Application October 13, 1950, Serial No. 189,930

2 Claims. (Cl. 129—16.7)

The invention relates to improvements in record cards and more particularly to improved visible index record cards having increased recording areas thereon.

The improved record cards characterized by the present invention comprise a combination of several differing cards assembled in unitary relation to provide an efficient type of index record. The basic element of the unit is a card holder having means thereon for attachment to a suitable filing tray or the like and provided with a title bearing portion visible when the card holder is so attached. Detachably secured to the card holder is an index card having plural rows of columnar headings imprinted thereon. Perforated within the limits of said headings are plural complemental diagonal slots that are provided for the securing therein of portions of master record cards. The latter cards have imprinted thereon columnar headings identical to the columnar headings imprinted on the said index card. Perforated marginally in the master cards are recesses which produce tongue-like formations in the margins immediately adjacent thereto. The tongue-like formations, having portions of the columnar headings thereon, are arranged to be inserted in the aforementioned index card complemental slots which positions the respective columnar headings in superimposed alignment. Thus, the portions of the columnar headings imprinted on the tongue-like formations are concealed from view. However, the corresponding portions of the heading imprinted on the index card are readily visible and align with the exposed portion of the record card headings to provide a readily identifiable heading.

Perforated within each of the master record cards are a pair of complemental slots similar to the aforementioned slots but disposed adjacent to the columnar headings, rather than within the limits thereof. The final elements of the units are detail record cards which have imprinted thereon ruled columnar indicia. Further, the said detail record cards are provided with analogous tongue-like formations which are arranged to be inserted within the slots provided in the master record card. When so disposed the columnar headings of the latter card align in a columnar relation with the ruled columnar indicia of the detail record cards.

The provision of plural rows of columnar heading indicia and related complemental slots in the index card enables several master record cards to be disposed thereon in superimposed offset relation. In this manner, the title-bearing portion of each master record card is visible.

The present invention consists essentially of the provision of columnar heading indicia on the said index card disposed relative to the complemental slots perforated therein, Heretofore it was necessary to remove the master card tongues each time an entry was to be made in the marginal columns, in order to ascertain the correct identification of the respective columns. Obviously, this method was time consuming and inconvenient and as a direct result thereof, permitted the introduction of erroneous entries. To overcome this objection, it was proposed that the columnar heading indicia be imprinted below the tongue-bearing margin. However, master record cards prepared in this manner were reduced in utility consequential to the loss of substantial recording area. The provision of complete heading indicia without any material loss of recording area in the instant invention eliminates these disadvantages. The complete marginal columnar identification present on a master record card when used therewith eliminates the erroneous entries heretofore resulting from the incomplete marginal columnar headings.

A further feature of the invention lies in the provision of complemental slots in the master record card spaced relative to the tongue-like formations and by means of which expendable detail record cards may be secured thereon in cooperative alignment. The predetermined spacing of the slots assures exacting registration of the detail card ruled columnar indicia with the master card columnar headings.

Figures 1, 2:
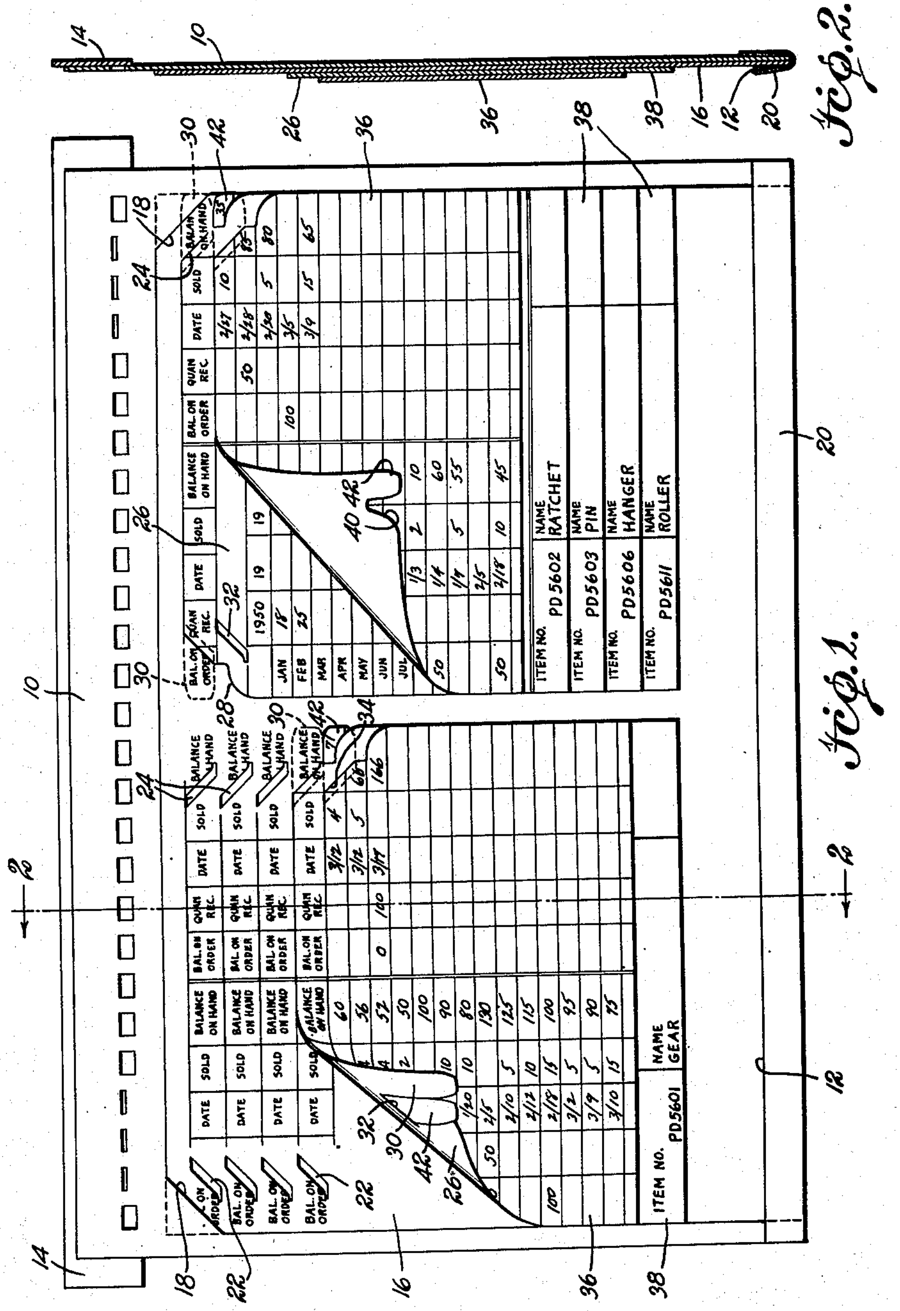
Fig. 1 is a plan view of the invention with corner portions of the record cards turned back to illustrate portions thereunder.
Fig. 2 is a cross section taken along line 2—2 of Fig. 1.

Referring to Figs. 1 and 2, there is shown therein, a card holder 10 having a title bearing pocket 12 formed at the lower margin thereof. Provided at the upper margin of card holder 10 is tab 14 by means of which the said card holder may be secured to a suitable conventional filing tray, not shown. The card holders 10 are disposed in the filing tray in overlapping superimposed offset relation to visibly position title bearing pockets 12 thereon in a similar offset manner.

An index card 16 is arranged to be positioned on card holder 10 with the upper corners of said card disposed in complemental diagonal slots 18 provided in the card holder. The lower margin of index card 16 is disposed in pocket 12 which is mounted on the free margin of card holder 10. The pocket 12 is formed of transparent material and embraces the lower margins of the respective index card and card holder for detachably retaining said index card thereon with the title bearing portion 20 in visible index position in a manner well known in the art.

Imprinted on index card 16 are plural rows of columnar headings and disposed within the limits of each row of headings are complemental diagonal slots 22, 24 respectively. The slots 22, 24 and the related headings are positioned in the upper region of index card 10 for reasons which will be hereinafter apparent.

Arranged to be secured to the index card 16 are master record cards 26. Each master record card 26 has formed in the upper side margins thereof, recesses 28 which cooperate with the upper margin of the card to define tongues 30. Imprinted along the upper margin of master record 26 and including the tongues 30 is columnar heading indicia identical to the columnar headings imprinted on index card 16. As shown in the right hand portion of Fig. 1, the columnar headings of master card 26 are positioned in superimposed alignment with the columnar headings on index card 16 when the tongues 30 are inserted in the related slots 22, 24. The portions of the headings imprinted on said tongues 30 are concealed by index card 16 when the tongues are disposed in the respective slots, however, the remaining visible portion of the columnar heading imprinted on index card 16 aligns with the balance of the master record card columnar headings and thus complete the heading identification.

Disposed adjacent to recesses 28 and below the columnar headings are complemental diagonal slots 32, 34 which are provided to secure a detail record card 36 therein. At the lower margin of the master record card there is provided a portion 38 on which a permanent title may be entered. When several master records 26 are mounted in the respective index card slots 22, 24, in superimposed offset relation, title bearing portions 38 are similarly offset and therefore remain visible.

Detail record cards 36 have formed therein recesses 40 which cooperate with the upper margins of the cards to define tongues 42. Tongues 42 are analogous to the master record card tongues 30 and are arranged to be received in the master record card slots 32, 34 for detachably mounting cards 36 on cards 26.

It will be noted that the ruled columnar indicia imprinted on the detail record cards 36 aligns in cooperative relation with the columnar headings present on the projecting master record card. The said detail card, therefore, provides a work sheet upon which numerous entries may be made. The lack of columnar headings on the detail card proper, increases the recording area thereof. Similarly no title area is required since the master record card carries the permanent title.

The above described record card unit amplifies the recording area heretofore present on cards of this type. By employing expendable detail record cards frequent entries may be made thereon and after a predetermined period, the entries may be tabulated and the total entered in the appropriate portion of the master record card.

The body of master record card 16 contains a recording area which may or may not relate to the columnar headings imprinted across the upper margin thereof. As illustrated in Fig. 1, the said recording area is not disposed in columnar alignment with the said headings but rather provides space for tabulated balance entries computed from the data entered on the detail record card 36. Should provision of co-aligning indicia on the body portion be required it may be readily accomplished without departing from the scope of the present invention.

To further increase the recording area of detail cards 36, each card has identical columnar indicia printed on both sides. Upon completion of entries on one side, the detail card may be readily removed, turned over and re-secured to the related master card 16. When both sides of the detail card have been utilized, the exhausted detail card 36 may be discarded and readily replaced with a fresh card without further preparation.

The master record cards 16 are similarly provided with printed indicia on both sides thereof, however, the title is entered on one side only and in order to utilize the opposite, the said master cards are arranged to be folded along suitable score lines, not shown. When employed in this manner, the title remains visible and the card may be readily identified.

The savings accomplished by the above method are obviously apparent since the master record card may provide for a period of several years and the unnecessary retyping of titles is eliminated. Analogously, associated master and detail record cards may be individually removed and discriminately positioned without disturbing adjacent records.

The invention claimed is:

1. A visible index comprising an index card having a pair of spaced horizontally aligned slots and having indicia aligned with, intersecting and extending on both sides of said slots for appropriately designating columns, a master record card having the upper marginal portion formed into attaching tongues at opposite ends extending through said pair of slots and connecting said master card to said index card with the ends of said tongues concealed by said index card, said master record card having the marginal portion including said tongues provided with heading indicia in duplicate form and superimposed registering relation with said heading indicia on said index card, and a detail record card having attaching portions detachably interengaged with complementary attaching portions on said master record card, said detail record card being mounted by said attaching portions in superimposed relation on said master record card with said marginal portion exposed along the upper edge thereof, said pair of slots and said tongues on said index and master record cards and said attaching portions on said master and detail record cards retaining said cards in assembled relation with said heading indicia on both said index and master record cards cooperating to appropriately designate the columns on both said detail and master record cards including columns on the side margins of said cards.

2. In a visible index, the combination of a card holder, an index card secured to said holder, a plurality of master record cards mounted in offset overlapping visible relation having vertical columns appropriately designated by heading indicia on the upper marginal portions, complementary interengaging attaching means on said index and at the upper corners of said master record cards detachably mounting said master record cards on said index card in offset overlapping visible index relation with said upper corner portions of the visible margin of said master record card and the indicia thereon concealed by said index card, and said index card having duplicate heading indicia in subjacent coincident relation with said heading indicia on said master record cards cooperating therewith to provide heading indicia for the columns at the sides of said master record card where said visible margin and indicia thereon is concealed.

WILHELM F. BLOCK.

REFERENCES CITED

The following references are of record in the file of this patent:

UNITED STATES PATENTS

| Number | Name | Date |
|---|---|---|
| 1,548,487 | Ross | Aug. 4, 1925 |

FOREIGN PATENTS

| Number | Country | Date |
|---|---|---|
| 489,086 | Great Britain | July 19, 1938 |